(12) United States Patent
Li

(10) Patent No.: US 8,624,979 B1
(45) Date of Patent: Jan. 7, 2014

(54) MONITORING APPARATUS FOR TELEVISION

(71) Applicants: Hong Fu Jin Precision Industry (ShenZhen) Co., Ltd., Shenzhen (CN); Hon Hai Precision Industry Co., Ltd., New Taipei (TW)

(72) Inventor: Jia Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/939,268

(22) Filed: Jul. 11, 2013

(30) Foreign Application Priority Data

Jul. 13, 2012 (CN) .................. 2012 1 02423849

(51) Int. Cl.
*H04N 17/00* (2006.01)
*H04N 17/02* (2006.01)

(52) U.S. Cl.
USPC ........... 348/180; 348/184; 348/461; 348/465; 348/473; 348/536; 348/540; 348/541; 348/542; 348/543; 348/544; 348/571; 348/687; 348/707; 348/714; 348/715; 348/725; 348/730; 348/733; 348/735; 455/556.1; 455/454; 455/262; 455/309; 455/311; 455/323; 324/522; 324/525; 324/537; 324/382; 324/519; 324/548; 324/658; 382/254; 332/117; 702/65

(58) Field of Classification Search
USPC ......... 348/180, 184, 465, 461, 473, 540, 541, 348/542, 543, 544, 571, 687, 707, 714, 715, 348/725, 730, 733, 735; 382/254; 455/556.1, 454, 262, 309, 311, 323; 332/117; 702/65; 324/522, 525, 537, 324/382, 519, 548, 658
See application file for complete search history.

(56) References Cited

U.S. PATENT DOCUMENTS

| | | | | |
|---|---|---|---|---|
| 4,151,387 | A * | 4/1979 | Peters, Jr. | 219/626 |
| 5,581,305 | A * | 12/1996 | Min | 348/571 |
| 5,600,251 | A * | 2/1997 | Akiyama | 324/613 |
| 6,108,052 | A * | 8/2000 | Arikane et al. | 348/735 |
| 6,459,734 | B1 * | 10/2002 | Kato et al. | 375/240.12 |
| 6,831,703 | B2 * | 12/2004 | Albella et al. | 348/468 |
| 7,912,312 | B2 * | 3/2011 | Hsieh et al. | 382/269 |
| 8,045,005 | B2 * | 10/2011 | Koo et al. | 348/180 |
| 8,509,680 | B2 * | 8/2013 | Atsmon et al. | 455/3.06 |
| 2002/0093589 | A1 * | 7/2002 | Albella et al. | 348/468 |
| 2003/0156228 | A1 * | 8/2003 | Lee et al. | 348/724 |
| 2006/0055473 | A1 * | 3/2006 | Takayama | 331/57 |
| 2008/0080219 | A1 * | 4/2008 | Sohma | 363/89 |
| 2008/0100706 | A1 * | 5/2008 | Breed | 348/143 |
| 2010/0073485 | A1 * | 3/2010 | Koo et al. | 348/180 |
| 2011/0096168 | A1 * | 4/2011 | Siann et al. | 348/158 |

* cited by examiner

*Primary Examiner* — Jefferey Harold
*Assistant Examiner* — Mustafizur Rahman
(74) *Attorney, Agent, or Firm* — Altis Law Group, Inc.

(57) ABSTRACT

A monitoring apparatus includes a detection circuit, a filter circuit, an amplifying circuit, a regulation circuit, a delay and charging circuit, and a driving circuit. The detection circuit receives a video signal, and performs an operation to obtain an image signal from the video signal. The filter circuit obtains an average intensity of a luminance signal corresponding to the image signal. The delay and charging circuit charges an input capacitor when receiving a low level regulated signal from the amplifying circuit. The driving circuit activates an alarm when a charging voltage of the chargeable capacitor exceeds a predetermined value.

13 Claims, 4 Drawing Sheets

MONITORING APPARATUS FOR TELEVISION

BACKGROUND

1. Technical Field

The present disclosure relates to an apparatus for monitoring a television.

2. Description of Related Art

In a related art, a television displays pictures from a video signal from a file, and a frequency range of the video signal is between 10 hertz (Hz) and 6 Megahertz (MHz). A frequency exceeding 500 Hz of the video signal will get a clear and smooth picture. Additionally, the picture displayed by the television needs to be monitored in real time by operators, to make sure the picture is normal. If the picture becomes abnormal, such as the television turning to a black screen, the file needs to be replaced with other files or manually played back, which is time-consuming and labour intensive.

Therefore, there is need for improvement in the art.

BRIEF DESCRIPTION OF THE DRAWINGS

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

DETAILED DESCRIPTION

Figure 1:
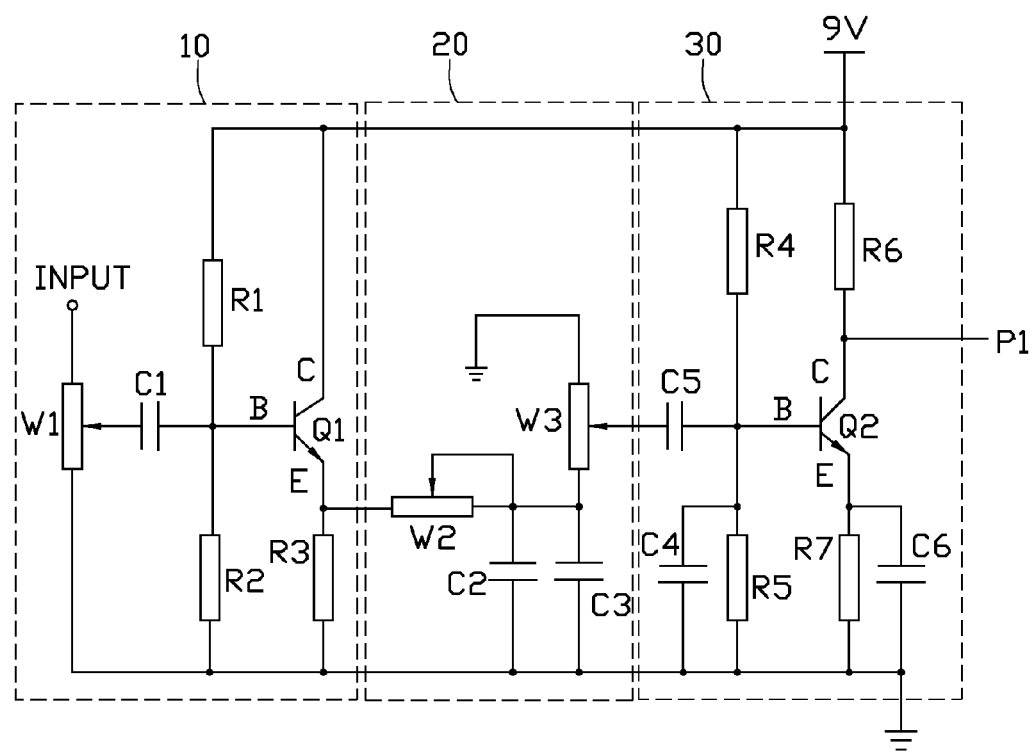
FIGS. 1 to 4 are circuit diagrams of an embodiment of a monitoring apparatus for a television of the present disclosure.
Figure 2:
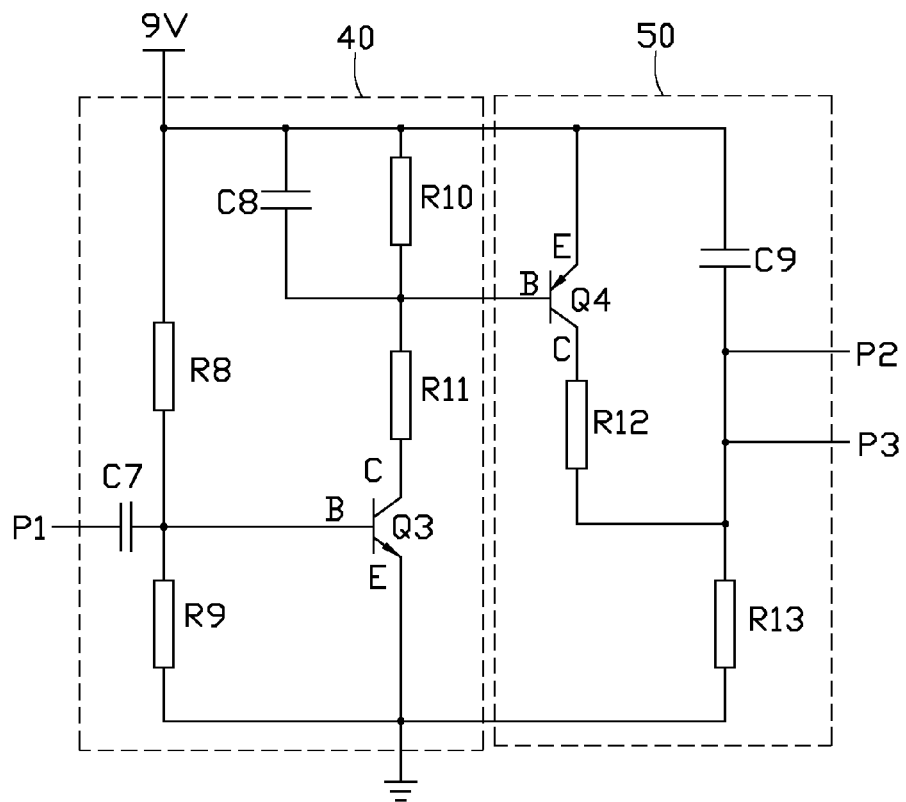
Figure 3:
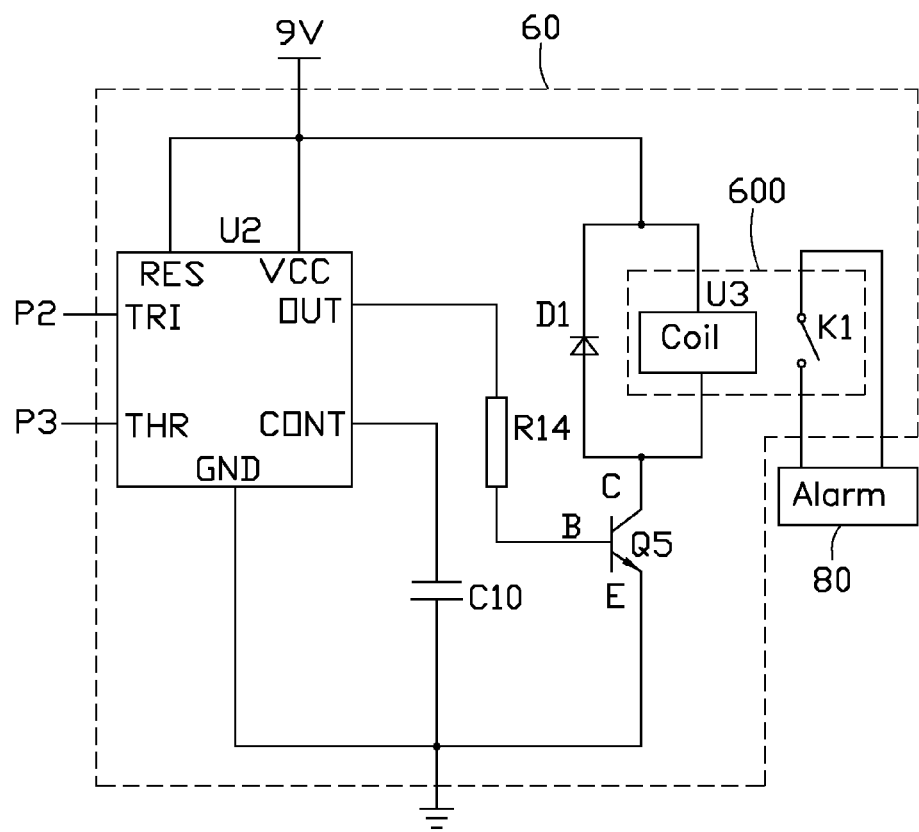
Figure 4:
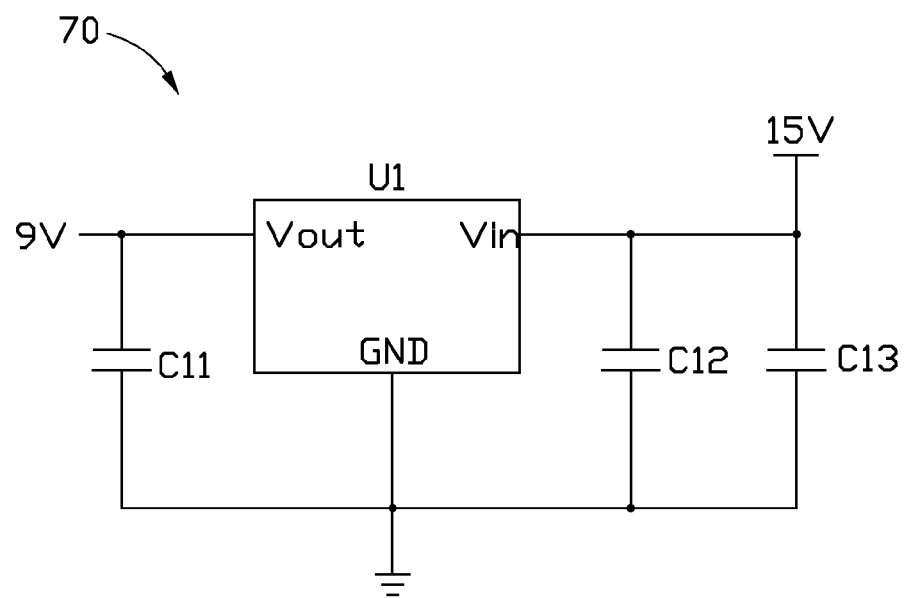

FIGS. 1 to 4 illustrate an embodiment of a monitoring apparatus for a television of the present disclosure. The monitoring apparatus includes a detection circuit 10, a filter circuit 20, an amplifying circuit 30, a regulation circuit 40, a delay and charging circuit 50, a driving circuit 60, and a power circuit 70.

In the art of television, a television video signal includes an image signal (including a chrominance signal and a luminance signal), a composite blanking signal, and a composite sync signal.

The detection circuit 10 receives a video signal outputted to the television, and carries out an operation to obtain an image signal of the video signal. The filter circuit 20 receives the image signal, and carries out a filter operation to obtain an average intensity of a luminance of the image signal. The amplifying circuit 30 amplifies a low frequency part of the average intensity of the luminance signal, and outputs an amplified signal. The regulation circuit 40 receives the amplified signal, carries out an operation to generate a regulated signal. The delay and charging circuit 50 controls a capacitor to charge or discharge according to the regulated signal. When a charging voltage of the capacitor exceeds a predetermined value, the driving circuit 60 controls an alarm 80 to give an alert.

The power circuit 70 outputs a conversion voltage of 9 volts (V), and includes a power chip U1 and three capacitors C11-C13. An input pin Vin of the power chip U1 is coupled to a power terminal 15V, and is also connected to ground through the capacitors C12 and C13 connected in parallel. An output pin Vout of the power chip U1 outputs the conversion voltage, and is connected to ground through the capacitor C11. In the embodiment, the capacitors C11-C13 are power filter capacitors, and the power circuit 70 converts a voltage of 15 V to 9V.

The detection circuit 10 includes a rheostat W1, a capacitor C1, an electronic switch Q1, and three resistors R1-R3. A first terminal of the electronic switch Q1 is coupled to the output pin Vout of the power chip U1, to receive the 9V voltage. A second terminal of the electronic switch Q1 is connected to ground through the resistor R3. A third terminal of the electronic switch Q1 is coupled to a wiper terminal of the rheostat W1 through the capacitor C1. The third terminal of the electronic switch Q1 is also connected to ground through the resistor R2, and connected to the first terminal of the electronic switch Q1 through the resistor R1. When the third terminal of the electronic switch Q1 is at a high voltage level, such as logic 1, the first terminal of the electronic switch Q1 is connected to the second terminal of the electronic switch Q1. When the third terminal of the electronic switch Q1 is at a low voltage level, such as logic 0, the first terminal of the electronic switch Q1 is disconnected from the second terminal of the electronic switch Q1. A first terminal of the rheostat W1 functions as an input INPUT of the monitoring apparatus, and receives the video signal, and a second terminal of the rheostat W1 is connected to ground. The rheostat W1 performs amplitude modulation in relation to the video signal, to obtain the image signal. The second terminal of the electronic switch Q1 outputs the image signal. In the embodiment, the electronic switch Q1 is an npn transistor, where a collector, an emitter, and a base of the npn transistor are the first, second, and third terminals of the electronic switch Q1, respectively.

The filter circuit 20 includes two rheostats W2 and W3, and two capacitors C2 and C3. A first terminal of the rheostat W2 is coupled to the second terminal of the electronic switch Q1. A second terminal of the rheostat W2 is connected to a wiper terminal of the rheostat W2, coupled to a first terminal of the rheostat W3, and connected to ground through the capacitors C2 and C3 connected in parallel. A second terminal of the rheostat W3 is connected to ground. A wiper terminal of the rheostat W3 outputs an average intensity of the luminance of the image signal.

The amplifying circuit 30 includes two capacitors C4 and C5, four resistors R4-R7, and an electronic switch Q2. A first terminal of the electronic switch Q2 is coupled to the output terminal Vout of the power chip U1 through the resistor R6, to receive the 9V voltage. A second terminal of the electronic switch Q2 is connected to ground through the resistor R7 and the capacitor C6 connected in parallel. A third terminal of the electronic switch Q2 is coupled to a wiper terminal of the rheostat W3 through the capacitor C5, to receive the average intensity of the luminance of the image signal. The third terminal of the electronic switch Q2 is coupled to the output pin Vout of the power chip U1 through the resistor R4, and is connected to ground through the resistor R5 and the capacitor C4 connected in parallel. The capacitor C4 filters out a high frequency part of the average intensity of the luminance. When the third terminal of the electronic switch Q2 is at a high voltage level, the first terminal of that the electronic switch Q2 is connected to the second terminal of the electronic switch Q2. When the third terminal of the electronic switch Q2 is at a low voltage level, the first terminal of the electronic switch Q2 is disconnected from the second terminal of the electronic switch Q2. The first terminal of the electronic switch Q2 outputs an amplification signal in relation to the low frequency part of the average intensity of the luminance. In the embodiment, the electronic switch Q2 is an npn transistor, where a collector, an emitter, and a base of the npn transistor are the first, second, and third terminals of the electronic switch Q2, respectively.

The regulation circuit 40 includes two capacitors C7 and C8, four resistors R8-R11, and an electronic switch Q3. A first terminal of the electronic switch Q3 is coupled to the output pin Vout of the power chip U1 through the resistors R11 and R10 in that order. A second terminal of the electronic switch Q3 is connected to ground. A third terminal of the electronic switch Q3 is coupled to the first terminal of the electronic switch Q2 through the capacitor C7, to receive the amplified signal. The third terminal of the electronic switch Q3 is coupled to the output pin Vout of the power chip U1 through the resistor R8, and is connected to ground through the resistor R9. When the third terminal of the electronic switch Q3 is at a high voltage level, the first terminal of the electronic switch Q3 is connected to the second terminal of the electronic switch Q3. When the third terminal of the electronic switch Q3 is at a low voltage level, the first terminal of the electronic switch Q3 is disconnected from the second terminal of the electronic switch Q3. In the embodiment, the electronic switch Q3 is an npn transistor, where a collector, an emitter, and a base of the npn transistor are the first, second, and third terminals of the electronic switch Q3, respectively. A node between the resistors R10 and R11 outputs the regulated signal concerning the amplified signal.

The delay and charging circuit 50 includes an electronic switch Q4, a capacitor C9, and two resistors R12 and R13. A first terminal of the electronic switch Q4 is connected to ground through the resistors R12 and R13 in that order. A second terminal of the electronic switch Q4 is coupled to the output pin Vout of the power chip U1, and is coupled to a node between the resistors R12 and R13 through the capacitor C9. A third terminal of the electronic switch Q4 is coupled to the node between the resistors R10 and R11. When the third terminal of the electronic switch Q4 is at a low voltage level, the first terminal of that the electronic switch Q4 is connected to the second terminal of the electronic switch Q4, and the capacitor C9 discharges. When the third terminal of the electronic switch Q4 is at a high voltage level, the first terminal of the electronic switch Q4 is disconnected from the second terminal of the electronic switch Q4, and the capacitor C9 is charged. A charging time of the capacitor C9 is R13*C9, where R13 stands for the resistance of the resistor R13, and C9 stands for the capacitance of the capacitor C9. In the embodiment, the electronic switch Q4 is a pnp transistor, where a collector, an emitter, and a base of the pnp transistor are the first, second, and third terminals of the electronic switch Q4, respectively.

The driving circuit 60 includes a control chip U2, a resistor R14, an electronic switch Q5, a diode D1, an alarm 80, and a relay 600.

A power pin VCC and a reset pin RES of the control chip U2 are coupled to the output pin Vout of the power chip U1. A ground pin GND of the control chip U2 is connected to ground. A trigger pin TRI and a threshold pin THR of the control chip U2 are coupled to the node between the resistors R12 and R13. A voltage control pin CONT of the control chip U2 is connected to ground through a capacitor C10. An output pin OUT of the control chip U2 is coupled to a third terminal of the electronic switch Q5 through the resistor R14. A first terminal of the electronic switch Q5 is coupled to an anode of the diode D1, and coupled to a first end of a coil U3 of the relay 600. A second terminal of the electronic switch Q5 is connected to ground. A cathode of the diode D1 is coupled to the output pin Vout of the power chip U1. A second end of the coil U3 of the relay 600 is coupled to the output pin Vout of the power chip U1. A switch K1 of the relay 600 is coupled to the alarm 80. When the third terminal of the electronic switch Q5 is at a high voltage level, the first terminal of the electronic switch Q5 is connected to the second terminal of the electronic switch Q5, the switch K1 of the relay 600 is turned on, and the alarm 80 is activated. When the third terminal of the electronic switch Q5 is at a low voltage level, the first terminal of the electronic switch Q5 is disconnected from the second terminal of the electronic switch Q5, and the switch K1 of the relay 600 is turned off. In the embodiment, the electronic switch Q5 is an npn transistor, where a collector, an emitter, and a base of the npn transistor are the first, second, and third terminals of the electronic switch Q5, respectively.

When a charging voltage of the capacitor C9 exceeds ⅔ of the voltage outputted by the output pin Vout of the power chip U1, the control chip U2 outputs a high voltage level through the output pin OUT. When the charging voltage of the capacitor C9 is recharged up to the ⅔ of the voltage outputted by the output pin Vout of the power chip U1 after being discharged, the output pin Out of the control chip U2 again outputs the high voltage level.

In the art of television, the frequency range of the video signal is from 10 hertz (Hz) to 6 megahertz (MHz). When the television turns to black or white screen, the video signal lacks the low frequency range from 10 Hz to 100 Hz, which indicates that the average intensity of the luminance signal does not include the low frequency part.

When the video signal is normal, that is, within the frequency range from 10 Hz to 6 MHz, the capacitor C4 of the amplifying circuit 30 performs a filter operation on the luminance signal, to filter out the high frequency part of the average intensity of the luminance signal, thereby obtaining only the low frequency part, with the frequency from 10 Hz to 100 Hz. The electronic switch Q2 amplifies the luminance signal, to generate the amplified signal. With the help of the capacitor C7 of the regulation circuit 40, the third terminal of the electronic switch Q4 receives a low voltage level signal, as the capacitor C7 regulates the amplified signal to the low voltage level signal. Accordingly, the node between the resistors R10 and R11 is at a low voltage level, and the electronic switch Q4 is turned on, which enables the capacitor C9 to discharge. The output pin OUT of the control chip U2 outputs no voltage, and the electronic switch Q5 is turned off. Hence, the switch K1 of the relay 600 is turned off, and the alarm 80 is not activated.

The video signal is abnormal when the frequency range of the video signal does not include the low frequency part with the range from 10 Hz to 100 Hz. Because the high frequency part of the video signal has been filtered out by the capacitor C4, the third terminal of the electronic switch Q4 does not receive a low voltage level signal. Consequently, the electronic switch Q4 is turned off, and the capacitor C9 begins to be charged. When the charging voltage of the capacitor exceeds ⅔ of the voltage provided by the power chip U1, the output pin OUT of the control chip U2 outputs a high level signal to the third terminal of the electronic switch Q5. The electronic switch Q5 is turned on, and the switch K1 of the relay 600 is turned on. Hence, the alarm 80 is activated.

While the disclosure has been described by way of example and in terms of preferred embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A monitoring apparatus, comprising:
a detection circuit to receive a video signal, and perform a first operation to obtain an image signal from the video signal;
a filter circuit to receive the image signal, and perform a second operation to obtain an average intensity of a luminance signal corresponding to the image signal;
an amplifying circuit to filter out a high frequency part of the luminance signal, and amplify a low frequency part of the luminance signal to generate an amplified signal;
a regulation circuit to regulate the amplified signal to output a regulated signal, wherein the regulation circuit outputs a low level regulated signal in response to the average intensity of the luminance signal being without the low frequency part;
a delay and charging circuit to charge an input capacitor when receiving the low level regulated signal; and
a driving circuit enabling an alarm to active when a charging voltage of the input capacitor exceeds a predetermined value.

2. The monitoring apparatus of claim 1, further comprising a power circuit with a first power terminal and a second power terminal, wherein the power circuit is configured to convert a first voltage from the first power terminal to a second voltage, and provides the second voltage to the detection circuit, the filter circuit, the amplifying circuit, the regulation circuit, the delay and charging circuit, and the driving circuit through the second power terminal.

3. The monitoring apparatus of claim 2, wherein the detection circuit comprises first to third resistors, a first capacitor, a first rheostat, and a first electronic switch; a first terminal of the first electronic switch receives the second power, a second terminal of the first electronic switch is connected to ground through the first resistor, a third terminal of the first electronic switch is coupled to a wiper terminal of the first rheostat through the first capacitor, the third terminal of the first electronic switch is coupled to the second power terminal through the second resistor, and is connected to ground through the third resistor; a first terminal of the first rheostat is configured to receive the video signal, a second terminal of the first rheostat is connected to ground; wherein when the third terminal of the first electronic switch is at a high voltage level, the first terminal of the first electronic switch is connected to the second terminal of the first electronic switch, when the third terminal of the first electronic switch is at a low voltage level, the first terminal of the first electronic switch is disconnected from the second terminal of the first electronic switch.

4. The monitoring apparatus of claim 3, wherein the filter circuit comprises second and third rheostats, and second and third capacitors, wherein a first terminal of the second rheostat is coupled to the second terminal of the first electronic switch, a second terminal of the second rheostat is connected to ground through the second and third capacitors connected in parallel, the second terminal of the second rheostat is coupled to a wiper terminal of the second rheostat, and coupled to a first terminal of the third rheostat; a second terminal of the third rheostat is connected to ground, a wiper terminal of the second rheostat is connected to the amplifying circuit.

5. The monitoring apparatus of claim 4, wherein the amplifying circuit comprises a second electronic switch, fourth and fifth capacitors, and fourth to seventh resistors, a first terminal of the second electronic switch is coupled to the second power terminal through the fourth resistor, a second terminal of the second electronic switch is connected to ground through the fifth resistor, a third terminal of the second electronic switch is coupled to the wiper terminal of the third rheostat through the fifth capacitor, and is coupled to the second power terminal through the sixth resistor, the third terminal of the second electronic switch is connected to ground through the seventh resistor and the fourth capacitor connected in parallel, wherein when the third terminal of the second electronic switch is at a high voltage level, the first terminal of the second electronic switch is connected to the third terminal of the second electronic switch, when the third terminal of the second electronic switch is at a low voltage level, the first terminal of the second electronic switch is disconnected from the second terminal of the second electronic switch.

6. The monitoring apparatus of claim 5, wherein the amplifying circuit further comprises a sixth capacitor, the second terminal of the second electronic switch is connected to ground through the sixth capacitor.

7. The monitoring apparatus of claim 5, wherein the regulation circuit comprises a third electronic switch, a seventh capacitor, and eighth to eleventh resistors, a first terminal of the third electronic switch is coupled to the second power terminal through the eighth and ninth resistors in that order, a second terminal of the third electronic switch is connected to ground, a third terminal of the third electronic switch is coupled to the first terminal of the second electronic switch through the seventh capacitor, the third terminal of the third electronic switch is coupled to the second power terminal through the tenth resistor, and is connected to ground through the eleventh resistor, wherein when the third terminal of the third electronic switch is at a high voltage level, the first terminal of the third electronic switch is connected to the third terminal of the third electronic switch, when the third terminal of the third electronic switch is at a low voltage level, the first terminal of the third electronic switch is disconnected from the second terminal of the third electronic switch.

8. The monitoring apparatus of claim 7, wherein the regulation circuit further comprise an eighth capacitor, the first terminal of the third electronic switch is coupled to the second power terminal through the tenth resistor and the eighth capacitor in that order.

9. The monitoring apparatus of claim 8, wherein the delay and charging circuit comprises a fourth electronic switch, a ninth capacitor, and twelfth and thirteenth resistors, the ninth capacitor is the input capacitor, a first terminal of the fourth electronic switch is connected to ground through the twelfth and thirteenth resistors in that order, a second terminal of the fourth electronic switch is coupled to the second power terminal, a third terminal of the fourth electronic switch is coupled to a node between the twelfth and thirteenth resistors, the node between the twelfth and thirteenth resistors is coupled to the second power terminal through the ninth capacitor, wherein when the third terminal of the fourth electronic switch is at a low voltage level, the first terminal of the fourth electronic switch is connected to the second terminal of the fourth electronic switch, when the third terminal of the fourth electronic switch is at a high voltage level, the first terminal of the fourth electronic switch is disconnected from the second terminal of the fourth electronic switch.

10. The monitoring apparatus of claim 9, wherein the driving circuit comprises a control chip, a tenth capacitor, a fourteenth resistor, a relay, and a fifth electronic switch, wherein the relay comprises a coil and a switch, reset and power pins of the control chip are coupled to the second power terminal, trigger and threshold pins of the control chip are coupled to the node between the twelfth and the thirteenth resistors, a ground pin of the control chip is connected to ground, a voltage control pin of the control chip is connected to ground through the tenth capacitor, a first terminal of the fifth electronic switch is coupled to a first end of the coil, a second terminal of the fifth electronic switch is connected to ground, a third terminal of the fifth electronic switch is coupled to an output pin of the control chip; a second end of the coil is coupled to the second power terminal; the alarm is coupled to the switch; when the charging voltage of the ninth capacitor exceeds the predetermined value, the output pin of the control chip outputs a high voltage signal to the third terminal of the fifth electronic switch, the first terminal of the fifth electronic switch is connected to the second terminal of the fifth electronic switch, the switch of the relay is turned on, the alarm gives an alert; when the charging voltage of the ninth capacitor is less than the predetermined value, the output pin of the control chip outputs a low voltage level signal to the third terminal of the fifth electronic switch, the first terminal of the fifth electronic switch is disconnected from the second terminal of the fifth electronic switch, the alarm gives no alert.

11. The monitoring apparatus of claim 10, wherein the power circuit comprises a power chip and eleventh to thirteenth capacitors, an input pin of the power chip is coupled to the first power terminal, the input pin of the power chip is connected to ground through the eleventh and twelfth capacitors connected in parallel, an output pin of the power chip is configured to output the second power terminal, the output pin of the power chip is connected to ground through the thirteenth capacitor, a ground pin of the power chip is connected to ground.

12. The monitoring apparatus of claim 10, wherein the driving circuit further comprises a diode, the first terminal of the fifth electronic switch is coupled to an anode of the diode, a cathode of the diode is coupled to the second power terminal.

13. The monitoring apparatus of the claim 12, wherein the first to third, and fifth electronic switches are npn transistors, the fourth electronic switch is a pnp transistor, wherein collectors, emitters, and bases of the transistors are the first, second, and third terminals of the first to fifth electronic switches, respectively.

* * * * *